United States Patent
Ishitoya et al.

(10) Patent No.: US 8,885,216 B2
(45) Date of Patent: Nov. 11, 2014

(54) PRINTING METHOD AND PRINTING PROCESSOR FOR COLOR IMAGES

(75) Inventors: Mitsuaki Ishitoya, Ibaraki-ken (JP);
Takashi Ebisawa, Ibaraki-ken (JP);
Yoshiyuki Okada, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 144 days.

(21) Appl. No.: 13/477,491

(22) Filed: May 22, 2012

(65) Prior Publication Data

US 2012/0307271 A1    Dec. 6, 2012

(30) Foreign Application Priority Data

May 31, 2011    (JP) .................................. 2011-121382

(51) Int. Cl.
| | | |
|---|---|---|
| H04N 1/60 | (2006.01) | |
| G03F 3/08 | (2006.01) | |
| G06K 9/00 | (2006.01) | |
| B41J 2/205 | (2006.01) | |
| B41J 2/21 | (2006.01) | |
| B41M 5/00 | (2006.01) | |

(52) U.S. Cl.
CPC ............... B41M 5/00 (2013.01); H04N 1/6058 (2013.01)
USPC ............ 358/1.9; 358/520; 382/162; 382/166; 382/167; 347/15; 347/43

(58) Field of Classification Search
CPC .... B41J 2/2132; B41J 2/04593; B41J 2/2121; H04N 1/6058; H04N 1/60; B41M 5/00
USPC .......... 358/1.9, 1.2, 3.12, 502, 523, 525, 520; 347/100, 43, 15, 19; 382/162, 166, 167
See application file for complete search history.

(56) References Cited

U.S. PATENT DOCUMENTS

| | | | | |
|---|---|---|---|---|
| 6,302,521 | B1* | 10/2001 | Ellson et al. ..................... | 347/43 |
| 6,377,366 | B1* | 4/2002 | Usami ............................ | 358/520 |
| 6,796,629 | B2* | 9/2004 | Komatsu et al. ................ | 347/15 |
| 7,345,787 | B2* | 3/2008 | Ito et al. ......................... | 358/1.9 |
| 7,463,384 | B2* | 12/2008 | Tsuchiya et al. ............... | 358/1.9 |
| 7,612,914 | B2* | 11/2009 | Ito et al. ......................... | 358/1.9 |
| 7,986,835 | B2* | 7/2011 | Takahashi ...................... | 382/167 |
| 2008/0309704 | A1* | 12/2008 | Kondo ............................ | 347/19 |

FOREIGN PATENT DOCUMENTS

| | | |
|---|---|---|
| CN | 1578733 A | 2/2005 |
| JP | 2009-220451 A | 10/2009 |

OTHER PUBLICATIONS

Chinese Application Official Action dated Jan. 28, 2014 (chinese only).

* cited by examiner

*Primary Examiner* — Charlotte M Baker
(74) *Attorney, Agent, or Firm* — Nath, Goldberg & Meyer; Jerald L. Meyer; Stanley N. Protigal

(57) ABSTRACT

A specific gamut of colors extending a reproduction range of colors in a color space is set to make for any ink color belonging to the specific gamut a conversion from CMYK dot pattern data into numbers of ink drops to be discharged from an inkjet head, using as a lookup table an extended pattern table having a maximal drop number '7'. For ink colors belonging to a gamut of colors outside the specific gamut, a default pattern table having a maximal drop number '5' is used as a lookup table for the conversion from CMYK dot pattern data into ink drop numbers.

7 Claims, 10 Drawing Sheets

FIG. 6A

RGB→L*a*b*

| R | G | B | L* | a* | b* |
|---|---|---|----|----|----|
| 0 | 0 | 0 | -  | -  | -  |
| 0 | 0 | 10 | - | -  | -  |
| 0 | 10 | 0 | - | -  | -  |
| ⋮ | ⋮ | ⋮ | ⋮ | ⋮ | ⋮ |
| 255 | 255 | 255 | - | - | - |

FIG. 6B

L*a*b*→CMYK

| L* | a* | b* | C | M | Y | K |
|----|----|----|---|---|---|---|
| 0 | 0 | 0 | - | - | - | - |
| 0 | 0 | 1 | - | - | - | - |
| 0 | 1 | 0 | - | - | - | - |
| ⋮ | ⋮ | ⋮ | ⋮ | ⋮ | ⋮ | ⋮ |
| 100 | 100 | 100 | - | - | - | - |

FIG. 7A

| 1 DROP | 2 DROPS | 3 DROPS | 4 DROPS | 5 DROPS | DROP NUMBER |
|--------|---------|---------|---------|---------|-------------|
| 20% | 40% | 60% | 80% | 100% | INK AMOUNT (%) |

FIG. 7B

| 1 DROP | 2 DROPS | 3 DROPS | 4 DROPS | 5 DROPS | 6 DROPS | DROP NUMBER |
|--------|---------|---------|---------|---------|---------|-------------|
| 20% | 40% | 60% | 80% | 100% | 120% | INK AMOUNT (%) |

FIG. 7C

| 1 DROP | 2 DROPS | 3 DROPS | 4 DROPS | 5 DROPS | 6 DROPS | 7 DROPS | DROP NUMBER |
|--------|---------|---------|---------|---------|---------|---------|-------------|
| 20% | 40% | 60% | 80% | 100% | 120% | 140% | INK AMOUNT (%) |

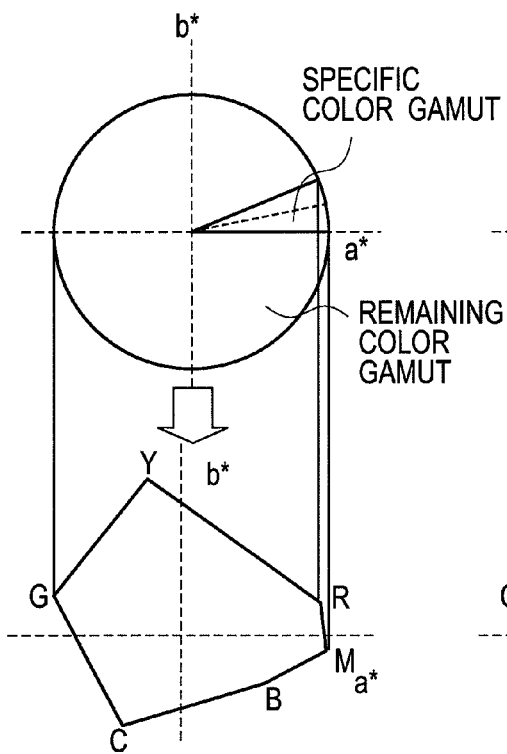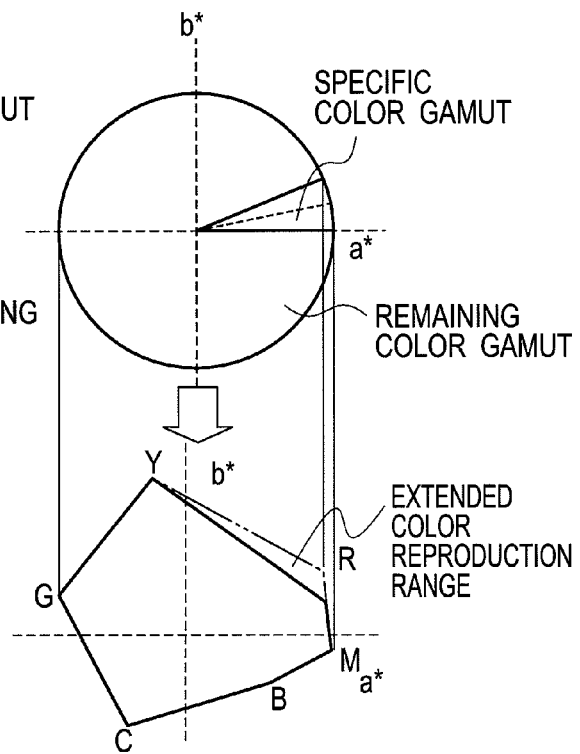

| RESOLUTION(dpi) | | 300 | 600 |
|---|---|---|---|
| MAX. DROP NUMBER | PLAIN PAPER | 5 | 4 |
| | MAT PAPER | 6 | 5 |
| | IJ CARD | 7 | 5 |

PRINTING METHOD AND PRINTING PROCESSOR FOR COLOR IMAGES

BACKGROUND OF THE INVENTION

1. Technical Field

The present invention relates to a printing method and a printing processor for color images based on color image data.

2. Background Arts

When printing color images, data on R (red), G (green), and B (blue) of color images are converted into data on C (cyan), M (magenta), Y (yellow), and K (black) to be used for the printing. In this occasion, CMYK data have narrow color reproduction ranges relative to color reproduction ranges of RGB data. Therefore, in some cases, printed color images become different in color shade from color images the users have expected on the data.

It is desirable for color reproduction ranges of CMYK data to be as wide as possible to have color images printed with color shades near to RGB data. For this reason, there is a technique disclosed as a relevant technique seeking to extend a color reproduction range in Japanese Patent Application Laid-Open Publication No. 2009-220451. In this technique, when printing color images superimposing a plurality of kinds of recording agents (inks), the order of each recording agent to be overprinted is changed depending on whether the light scattering property of the recording agent is strong or weak.

SUMMARY OF THE INVENTION

However, CMYK inks have their light scattering properties not widely varied in the intensity among them, even though raw materials of the inks are more or less different. Hence, there is an inherent limit to extending the color reproduction range by interchanging the orders of inks to be overprinted. Also, there is a restriction to hues in extendable color reproduction ranges.

The preset invention has been invented in view of the foregoing state of things. It is an object of the present invention to provide a printing method adapted to extend a color reproduction range with respect to an arbitrary hue when printing color images based on color image data. It also is an object of the present invention to provide a printing processor adapted to execute a processing when implementing the printing method.

To achieve the object, according to an aspect of embodiment of the present invention, there is provided a printing method of printing color images. This is a printing method of printing color images based on color image data (for instance, dot image data of an RGB format input at an RGB dot image inputter 110 in FIG. 1) in a prescribed reproduction range of colors (for instance, a color reproduction range illustrated in a lower half of FIG. 10A) in a color space. The printing method includes setting a specific gamut of colors (for instance, a color gamut of a sector form illustrated in an upper half of FIG. 10A) extending the reproduction range. And the printing method includes making a maximal discharge amount per unit area of ink (for instance, a maximal drop number in a table in FIG. 7B or FIG. 7C) to be used to print colors in the specific gamut among the color images greater than a maximal discharge amount per unit area of ink (for instance, a maximal drop number in a table in FIG. 7A) to be used to print colors in a gamut of colors outside the specific gamut among the color images.

Further, to achieve the object, according to an aspect of embodiment of the present invention, there is provided a printing processor for printing color images. This is a printing processor adapted to implement a processing of using multi-color inks to print color images based on color image data in a prescribed reproduction range of colors in a color space. The printing processor includes a setter (for instance, an image processor 223 in FIG. 3 combined with mode selecting regions 241a to 241c in FIG. 13), and a converter (for instance, the image processor 223 in FIG. 3 associated with a step S207 in FIG. 16). The setter sets a specific gamut of colors extending the reproduction range. The converter converts color image data in a gamut of colors outside the specific gamut set up by the setter, into data of ink amounts of a multi-color ink having a prescribed reference value (for instance, a maximal drop number='5' in a default pattern table in FIG. 7A) as a maximal discharge amount per unit area. The converter converts color image data in the specific gamut set up by the setter, into data of ink amounts of a multi-color ink having an upper limit value (for instance, a maximal drop number='6' or '7' in an extended pattern table in FIG. 7B or FIG. 7C) greater than the reference value as a maximal discharge amount per unit area.

BRIEF DESCRIPTION OF THE DRAWINGS

FIG. 6A and FIG. 6B are illustrations describing contents of lookup tables installed in a color conversion processor in FIG. 1.

FIGS. 7A, 7B, and 7C are tables showing contents of lookup tables installed in an image processor in FIG. 3, respectively.

FIGS. 10A and 10B are graphs illustrating color reproduction ranges before increasing or after having increased a maximal drop number of an ink of a color belonging to a specific gamut of colors on an a*b* plane, respectively.

DESCRIPTION OF THE EMBODIMENTS

Figure 1:
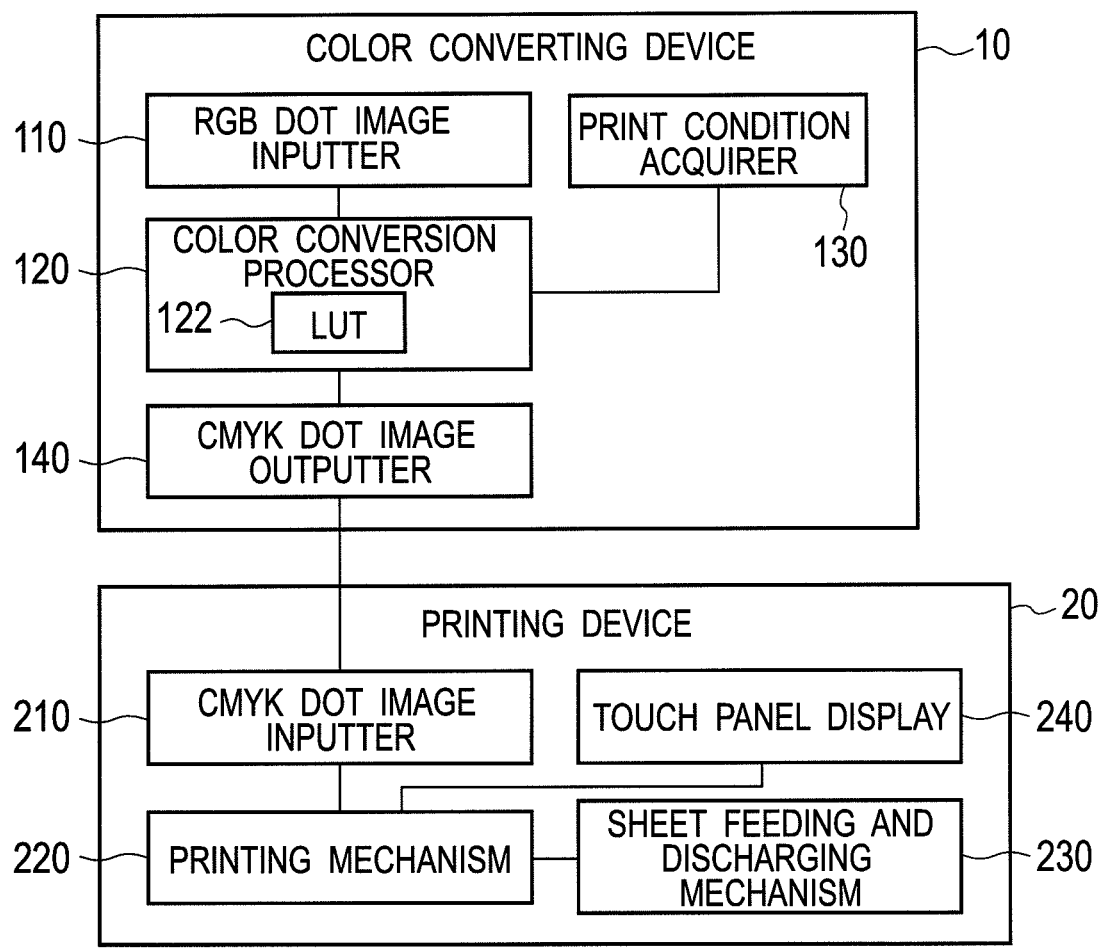
FIG. 1 is a block diagram showing a functional configuration of a printing device connected to a color converting device implemented as an image processor according to an embodiment of the present invention.

There will be described embodiments of the present invention, with reference to the drawings. FIG. 1 shows in a block diagram a functional configuration of a printing device 20 connected to a color converting device 10 as a printing processor according to an embodiment of the present invention. It is noted that in this embodiment the printing device 20 is implemented as a line type inkjet printer adapted to print dot arrays of color images by a single scan in a main scan direction perpendicular to a transfer direction of recording sheet. It also is noted that the printing device 20 is implemented as an inkjet printer of a multi-drop system adapted to increase or decrease the number of ink droplets to be propelled onto one dot (pixel) as necessary to make a tone printing.

As shown in FIG. 1, the color converting device 10 includes an RGB dot image inputter 110, a color conversion processor 120, a print condition acquirer 130, and a CMYK dot image outputter 140. The RGB dot image inputter 110 inputs dot image data of an RGB format. The color conversion processor 120 converts image data of the RGB format into image data of a CMYK format. The print condition acquirer 130 acquires a print condition to the printing device 20. The CMYK dot image outputter 140 outputs dot image data of the CMYK format.

The RGB dot image inputter 110 inputs RGB dot image data represented by e.g. eight bits for each color, i.e., color image data from another functional component in the device or from an external device. The color conversion processor 120 converts RGB values of color image data into dot image data of CMYK depending on a color reproduction range of the printing device 20. For use to the conversion, the color conversion processor 120 includes lookup tables (LUT) 122, and a memory for the storage. The lookup tables 122 are tables having recorded correspondence relations between representative values of RGB and CMYK values.

The print condition acquirer 130 acquires a print condition set up by the user. The print condition may include information such as presence or absence of an extension of color reproduction range, a color gamut for the extension, and a type of recording sheet to be used for the printing, at least in part. The print condition acquirer 130 may be operable to accept a print condition from the user. The print condition acquirer 130 may acquire a print condition accepted from the user at another functional component.

The CMYK dot image outputter 140 processes dot image data converted into the CMYK format, as necessary for an intermediate processing, to output to the printing device 20. The intermediate processing is a processing for CMYK dot images represented by e.g. eight bits to be represented by tones printable at the printing device 20. The CMYK dot image outputter 140 outputs CMYK dot images to the printing device 20 together with a print condition acquired at the print condition acquirer 130.

As shown in FIG. 1, the printing device 20 includes a CMYK dot image inputter 210, a printing mechanism 220, a sheet feeding and discharging mechanism 230, and a touch panel display 240. The CMYK dot image inputter 210 inputs dot image data of the CMYK format. The sheet feeding and discharging mechanism 230 is operable to feed and discharge recording sheets. The touch panel display 240 is adapted for various rendering and settings to be input.

In this embodiment the printing mechanism 220 extends in the main scan direction perpendicular to the sheet transfer direction (as a sub-scan direction). The printing mechanism 220 includes a set of inkjet heads each formed with multiple nozzles. Inkjet heads employed are each implemented as an inkjet system to discharge a black or color ink for a printing. Other systems may well be employed.

Figure 2:
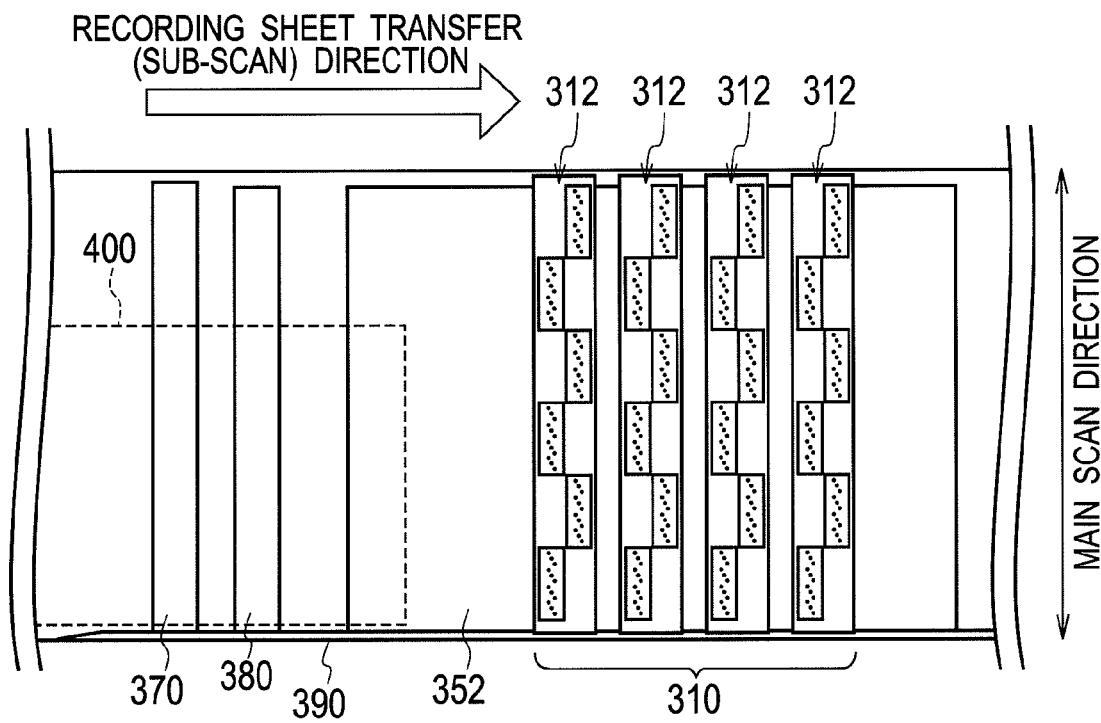
FIG. 2 is a plan view showing a general configuration of a section of the printing device in FIG. 1 working to make a print on a recording sheet.

FIG. 2 shows in a plan view a general configuration of a section of the printing device in FIG. 1 working to make a (text) print on a recording sheet. The sheet feeding and discharging mechanism 230 shown in FIG. 1 has a transfer belt 352 cooperating with a register roller 370 to transfer a recording sheet 400 under a head unit 310. It has a component 380 working as a sheet position sensor, and a component 390 working as a guide. The component 380 detects a position of a recording sheet 400 in the transfer direction (sub-scan direction). The component 390 restricts a position of the recording sheet 400 on the transfer belt 352 in a printing scan direction (as the main scan direction).

The printing device 20 is implemented as a line color printer of an inkjet system to discharge a black or color ink from a respective inkjet head to make a printing in the unit of a line. The printing device 20 includes the head unit 310 as part of the printing mechanism 220, which is composed of arrays of inkjet heads 312 provided by color. Each inkjet head 312 has a multiplicity of nozzles formed thereto, and extends in a direction perpendicular to the sheet transfer direction. The head unit 310 is disposed downstream of the register roller 370 in the transfer direction. The transfer belt 352 is shaped in a loop form and extends along a plane opposing the head unit 310. A recording sheet 400 is set on the transfer belt 352 and carried at a speed depending on a print condition, when inkjet heads 312 of the head unit 310 are operated to discharge inks from their nozzles. The recording sheet 400 thus has images formed thereon by inks discharged thereto in the unit of a line.

The arrays of inkjet heads 312 are assigned to CMYK ink colors, in a configuration having blocks of multiple nozzles sub-arrayed at the downside. In the example in FIG. 2, each array of inkjet heads 312 includes six blocks. Each block has one or more arrays of nozzles arranged oblique in a unit of a prescribed nozzle number, for the resolution to be enhanced. In this embodiment, the color-assigned arrays of inkjet heads 312 are disposed in the order of C (cyan), K (black), M (magenta), and Y (yellow) from an upstream end in the transfer direction of recording sheet 400.

Figure 3:
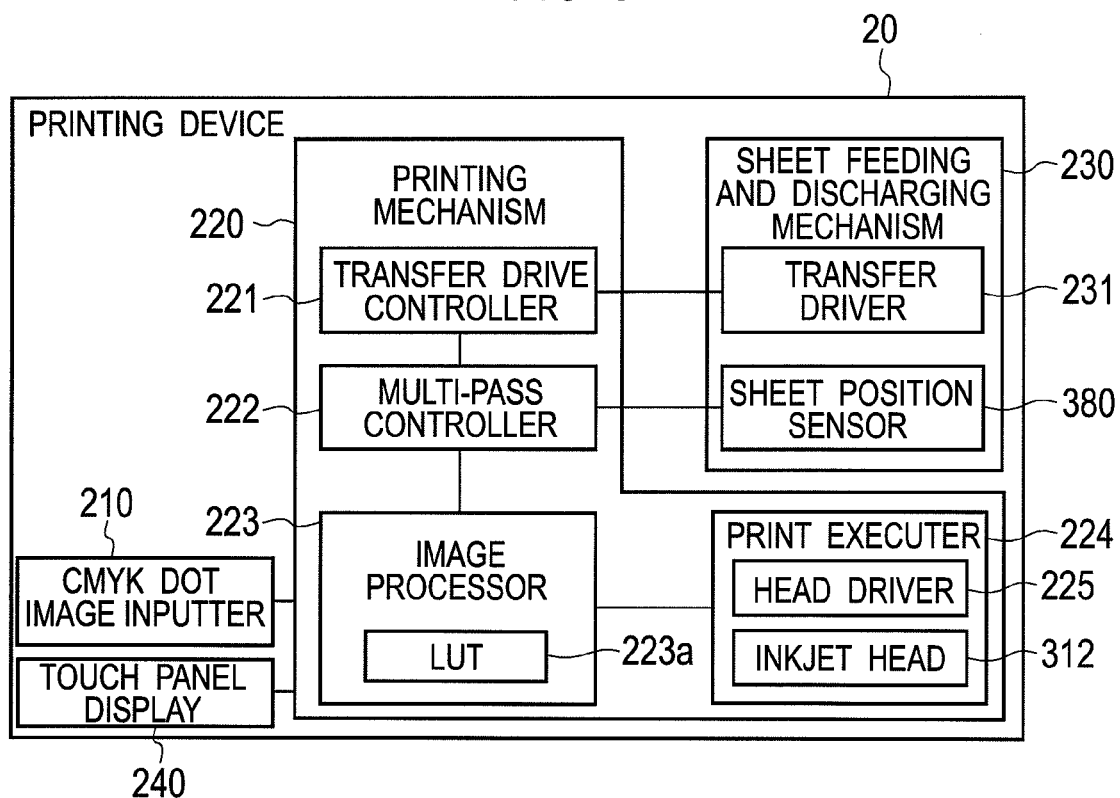
FIG. 3 is a block diagram showing an electrical specific configuration of the printing device in FIG. 1.

FIG. 3 shows in a block diagram an electrical specific configuration of the printing device in FIG. 1. In the printing device 20 shown in FIG. 1 the sheet feeding and discharging mechanism 230 includes a transfer driver 231 covering drive rollers and the like in a system of transfer routes, involving the sheet position sensor 380. The printing device 20 shown in FIG. 1 includes a transfer drive controller 221 for controlling the transfer driver 231. It further includes a multi-pass controller 222 for controlling a multi-pass processing, an image processor 223 for executing an image processing, and a print executer 224 as will be described later-on. The image processing to be executed at the image processor 223 includes supplying the printing mechanism 220 with image data commensurate with ink discharge amounts in each printing. The print executer 224 includes the arrays of inkjet heads 312, and besides a head driver 225 for controlling the discharge of ink at nozzles of inkjet heads 312.

In this embodiment the multi-pass controller 222 implements a process of making the transfer drive controller 221 control the transfer driver 231 to operate for transfer of a recording sheet 400 in accordance with a position of the recording sheet 400 in the transfer direction, as it is detected by the sheet position sensor 380.

The CMYK dot image inputter 210 receives CMYK dot image data from the color converting device 10 shown in FIG. 1. Then, the image processor 223 converts the received data into image data. The head driver 225 uses the image data as a basis to generate ink discharge signals, whereby inkjet heads 312 are driven to discharge droplets of ink.

For this reason, the image processor 223 converts dot image data of CMYK format (tone data) into data of an ink amount, that is, print-addressing multi-value data representing the number of drops of ink to be propelled out of a nozzle of an inkjet head 312. For this conversion, the image processor 223 includes lookup tables (LUT) 223a, and a memory for the storage. The lookup tables 223a are tables having recorded correspondence relations between CMYK values and values of print-addressing multi-value data (drop numbers).

Figure 4A:
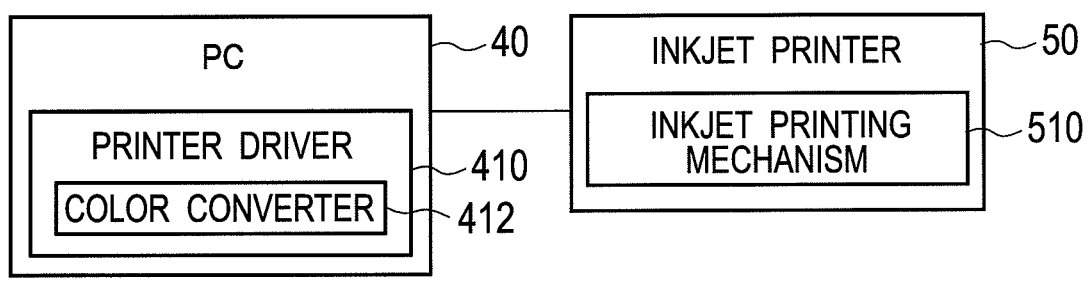
FIG. 4A and FIG. 4B are block diagrams each showing a specific example of system configuration including elements corresponding to the printing device and the color converting device in FIG. 1.
Figure 4B:
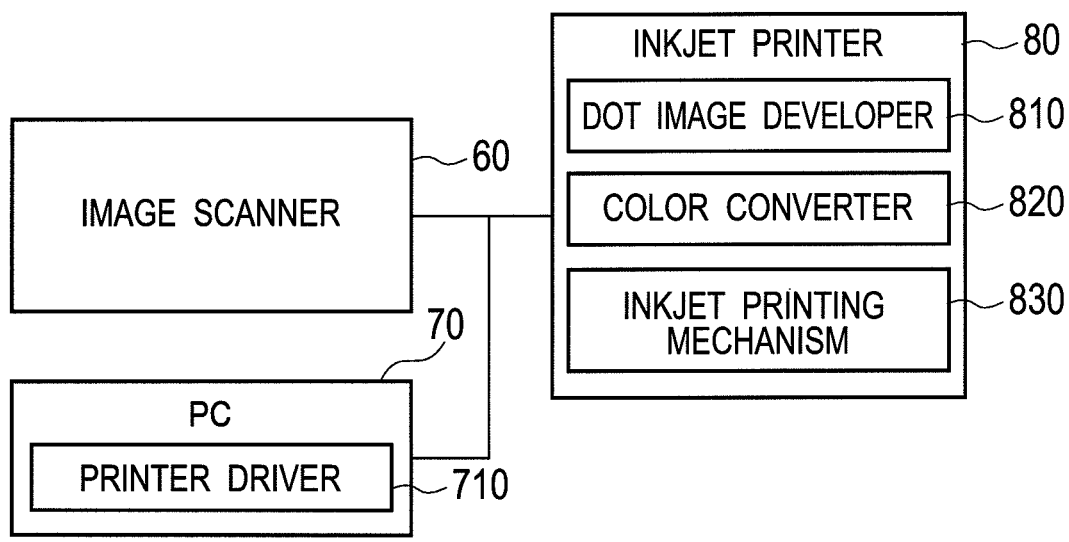

In FIG. 1 the color converting device 10 is combined with the printing device 20. Such a combination may be implemented as a specific system configured as shown in FIG. 4A or FIG. 4B. FIG. 4A shows an example of system configured with a PC (personal computer) 40 including a printer driver 410, and an inkjet printer 50 including an inkjet printing mechanism 510. In this system, the printer driver 410 includes a color converter 412. The PC 40 may have image data of an RGB format prepared by an application therein, or image data read from a digital camera or the like. At the PC 40, such image data can be developed into dot images, and additionally processed for a color conversion into a CMYK format to output to the inkjet printer 50. In this case, the PC 40 functions as a color converting device 10, and the inkjet printer 50 functions as a printing device 20.

FIG. 4B shows an example of system configured with an image scanner 60, a PC 70 including a printer driver 710, and an inkjet printer 80 including a dot image developer 810, a color converter 820, and an inkjet printing mechanism 830. In this system, the image scanner 60 scans image data in an RGB format, which may be color-converted at the color converter 820 in the inkjet printer 80, to print at the inkjet printing mechanism 830. Or else, at the PC 70, the printer driver 710 outputs page-description language, which may be developed into dot images at the dot image developer 810 in the inkjet printer 80, and color-converted into a CMYK format at the color converter 820, to print at the inkjet printing mechanism 830. In this case, the inkjet printer 80 functions as a combination of a color converting device 10 and a printing device 20.

There may be a configuration including a printing device 20 provided with an image scanner, to make a print based on data of color images read by the image scanner. This configuration also is applicable, though un-depicted. In this case, the printing device 20 may have an incorporated color converting device 10, so that data of color images read by the image scanner can be image-processed using the color converting device 10 in the printing device 20.

Figure 5A:
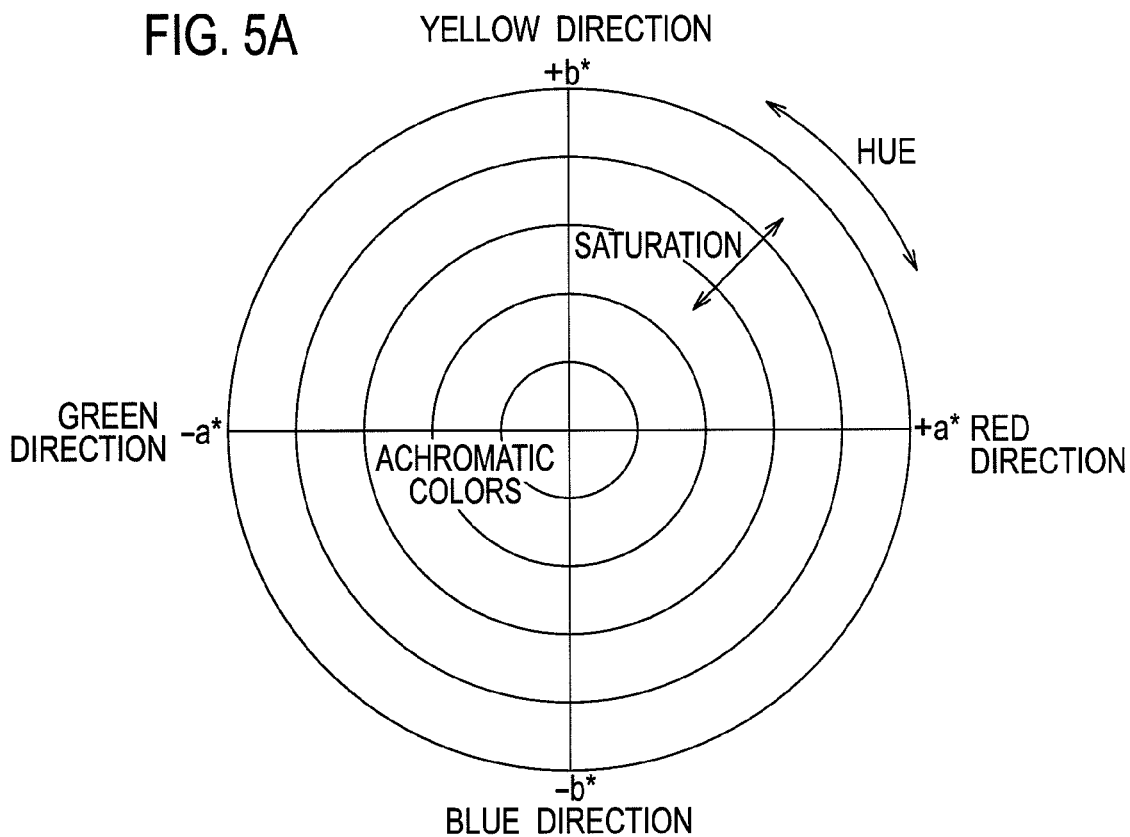
FIG. 5A and FIG. 5B are illustrations describing an outline of a color space to be discussed in the embodiment.
Figure 5B:
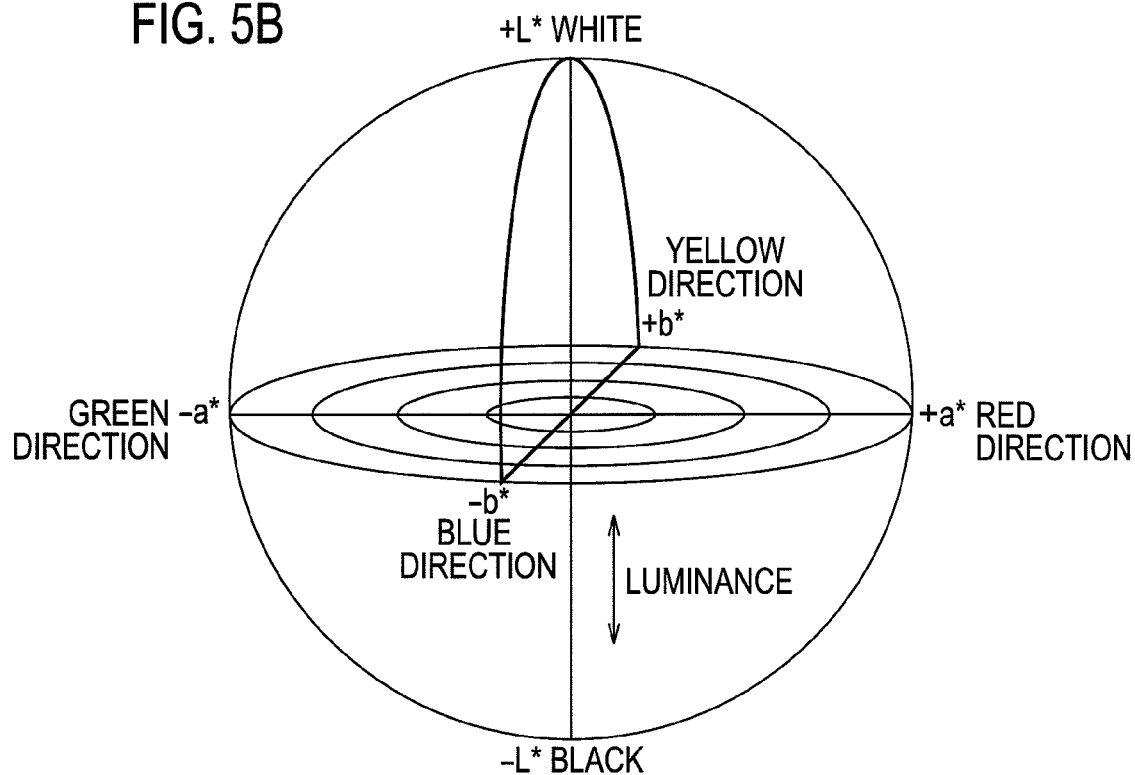

Description is now made of an outline of a color space to be dealt in this embodiment, with reference to FIG. 5A and FIG. 5B. This embodiment employs an L*a*b* color system standardized by the International Commission on Illumination (ICE). In the L*a*b* color system, the lightness is denoted by a notation L*, and the chromaticity representing a hue and a saturation is denoted by notations a*b*.

As illustrated in FIG. 5A, a* and b* indicate directions of color, respectively. Designated at +a* is a red direction, −a* is a green direction, +b* is a yellow direction, and −b* is a blue direction. Accordingly, an angle on a*b* plane represents a hue. Colors become bright as they get away from the center, and become dim as they get close to the center. In other words, the distance from the center represents a degree of saturation, and the central part is achromatic.

FIG. 5B is a stereoscopic presentation of a color space in the L*a*b* color system indicating the direction of an L* axis also. This space indicates a space that can represent color images. Generally, color reproduction ranges that printing devices can actually reproduce are narrower than color reproduction ranges of color image data. Therefore, when using color image data to make a print, a color conversion is made to compress the color space to be adaptive to a color reproduction range of the printing device.

Description is now made of an outline of a color conversion process in the color converting device 10 in FIG. 1 that is configured with the color converter 412 of the PC 40 or the color converter 820 of the inkjet printer 80 shown in FIG. 4A or FIG. 4B. The color converting device 10 has lookup tables 122 installed the color conversion processor 120, which are used to convert dot image data of an RGB format into dot image data of a CMYK format, as described.

The lookup tables 122 in the color conversion processor 120 are correspondence tables between an RGB color space and a CMYK color space. To prepare the correspondence tables, first, there is set a correspondence relation from an RGB format to a L*a*b* color system. Generally, color reproduction ranges of printing devices are narrower than color reproduction ranges of digital cameras or display devices. So, there is made a setup for color conversion to compress a color gamut in the L*a*b* color system. Next, there is set a correspondence relation from the L*a*b* color system after color conversion to a CMYK format. By doing so, lookup tables from the RGB format to the CMYK format are prepared.

FIG. 6A and FIG. 6B are illustrations describing contents of lookup tables 122 installed in the color conversion processor in FIG. 1. The lookup tables 122 include a table (refer to FIG. 6A) of correspondence relations to be used when converting color image data input to the RGB dot image inputter 110 in FIG. 1, for conversion from an RGB color system to a L*a*b* color system. The lookup tables 122 include also a table (refer to FIG. 6B) to be used for setting a correspondence relation from the L*a*b* color system to a CMYK format depending on a type of the printing device 20.

The color conversion processor 120 converts RGB dot image data (as color image data) input from the RGB dot image inputter 110, for conversion from the RGB color system to the L*a*b* color system using a table shown in FIG.

6A. After that, it converts the converted color image data, for conversion from values of L*a*b* to values in a CMYK color system using a table shown in FIG. 6B. Converted values in the CMYK color system are output as CMYK dot image data from the CMYK dot image outputter 140 in FIG. 1 to the printing device 20.

Description is now made of an outline of a data conversion process in the printing device 20 in FIG. 1 that is configured with the inkjet printing mechanism 510 or 830 of the inkjet printer 50 or 80 shown in FIG. 4A or FIG. 4B. The printing device 20 has lookup tables 223a installed in the image processor 223, which are used to convert CMYK dot image data into print-addressing multi-value data, as described.

The lookup tables 223a in the image processor 223 are correspondence tables between color image data (CMYK dot image data) in the CMYK color space and print-addressing multi-value data. More specifically, they are correspondence tables between CMYK values of color image data in the CMYK color space and corresponding numbers of drops of CMYK inks to be propelled out of nozzles of inkjet heads 312 shown in FIG. 2.

FIGS. 7A, 7B, and 7C are tables showing contents of lookup tables 223a installed in the image processor 223 in FIG. 3, respectively. The lookup tables 223a are tables showing correspondence relations to be used when converting CMYK dot image data input to the CMYK dot image inputter 210 in FIG. 3, for conversion to print-addressing multi-value data to be prepared by CMYK colors. The lookup tables 223a include a combination of a default pattern table (FIG. 7A) and two types of extended pattern tables (FIG. 7B and FIG. 7C) for the respective color. The default pattern table is used when setting the color reproduction range as a normal color reproduction range, and either extended pattern table is used when setting the color reproduction range. The tables shown in FIGS. 7A, 7B, and 7C are prepared for use to C (cyan), M (magenta), Y (yellow), and K (black), respectively.

The default pattern table shown in FIG. 7A corresponds to a normal color reproduction range, and has a listing of numbers of drops of ink associated with values of CMYK dot image data, of which a maximal value (as a maximal discharge amount) is set to a value of 5 drops (as a reference value). The maximal value of drop number (=5 drops) is determined in consideration of the amount of ink soaked in a recording sheet 400, as well as the amount of sheet deformation and the degree of through density of ink soaking from a printed side to the reverse.

The extended pattern tables shown in FIGS. 7B and 7C are tables that have their maximal drop numbers set to a value of 6 drops (as an upper limit) and a value of 7 drops (as an upper limit), respectively. These values are increased relative to the maximal drop number set to the value of 5 drops in the default pattern table shown in FIG. 7A. Therefore, when converting CMYK dot image data into drop numbers using either extended pattern table, allotted drop numbers become equal to or greater than those drop numbers to be given in a conversion using the default pattern table. By this effect, in a gamut of colors using either extended pattern table for the conversion into drop numbers, the density of image is increased, giving rise to an increased color reproduction range in the color gamut.

There is a range of colors defined by values of CMYK=(x1, y1, z1, α1)~(x100, y100, z100, α100). This range permits designation of a specific gamut of colors to extend the color reproduction range. Values in this range correspond to respective colors (yellow, bright yellow, . . . , red, green, dark green, . . . ). This range includes the specific gamut of colors, and a gamut of colors outside the specific gamut. In the latter gamut, the value of 5 drops (100%) defined in the default pattern table shown in FIG. 7A is allotted to respective maximal values of CMYK. In the specific gamut, the value of 6 drops (120%) defined in the extended pattern table shown in FIG. 7B or the value of 7 drops (140%) defined in the extended pattern table shown in FIG. 7C is allotted to respective maximal values of CMYK.

Further, for instance, there may be a red color (C, M, Y, K)=(0.50, 100, 0) designated as a color in the specific gamut. In this case, one of the extended pattern tables shown in FIGS. 7B and 7C can be used to convert M=50 and Y=100 into drop numbers (using a common table to both M and Y).

Figure 8:
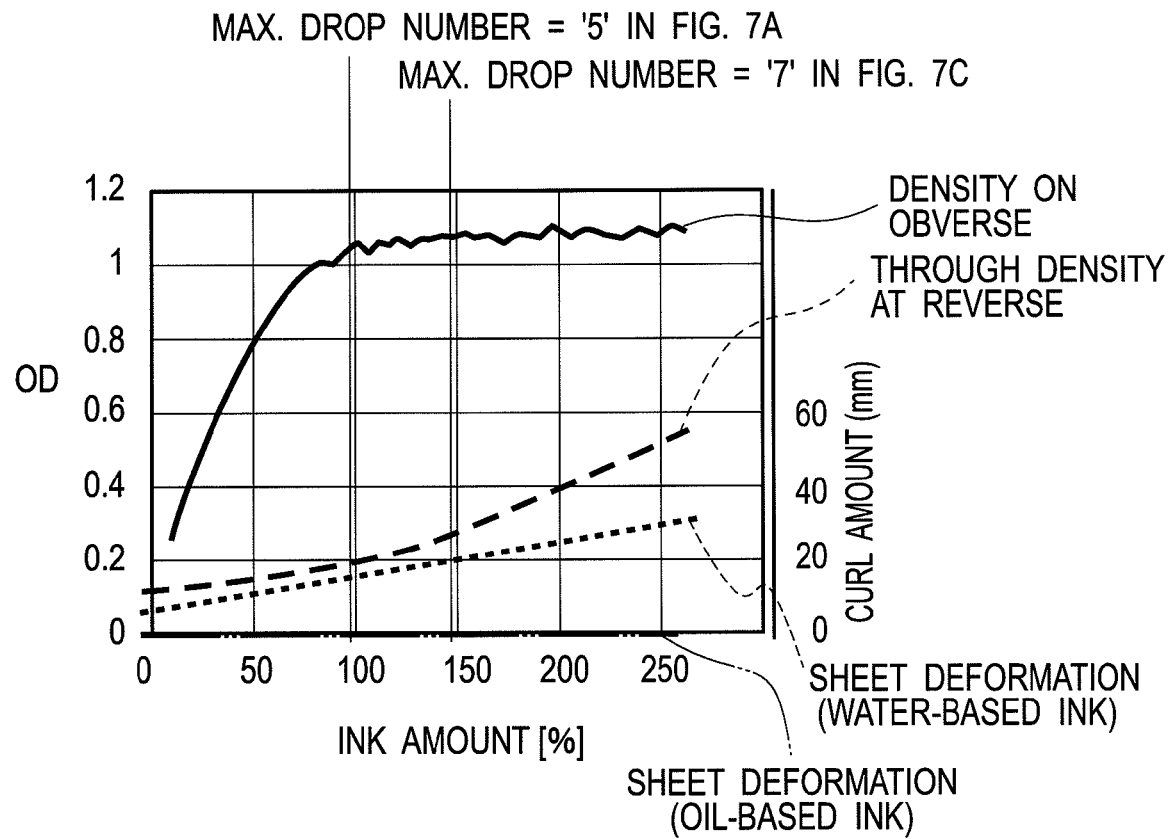
FIG. 8 is a graph showing relationships that an amount of ink to be used per unit area of recording sheet to print images thereon has to an amount of sheet deformation and densities of ink on both sides of printed recording sheet, respectively.

FIG. 8 is a graph showing relationships that an amount of ink to be used per unit area of a recording sheet 400 to print images thereon has to a density of image (as an obverse density) on a printed side, a density of ink (as a through-density of ink) soaked through to the reverse side, and sheet deformations (in use of a water-based ink and in use of an oil-based ink), respectively. The recording sheet 400 was a plain paper sheet. Ink used was a primary color ink (as a process color ink). When printing, the resolution was 300 dpi.

In the graph in FIG. 8, the horizontal axis represents a percentage value of an amount of ink used per unit area when printing each dot (pixel) using a maximal number of drops of ink. The ink amount is set to 100% for the maximal drop number=5. The graph in FIG. 8 has vertical axes, which represent OD values indicating an obverse density and a through-density, and a curl amount indicating sheet deformations.

Figure 9A:
FIGS. 9A, 9B and 9C are illustrations of a conceptual sheet deformation represented by a curl amount shown in FIG. 8, and appearances of sheets deformed by oil-based or water-based ink, respectively.
Figure 9B:
Figure 9C:

FIGS. 9A, 9B, and 9C are illustrations of a conceptual sheet deformation represented by a curl amount shown in FIG. 8, and appearances of sheets deformed by oil-based or water-based ink, respectively. As illustrated in FIG. 9A, when printing using ink, the recording sheet 400 undergoes a sheet deformation (warp=curl) due to soaked ink. The curl amount of recording sheet 400 was insignificant in use of an oil-based ink as illustrated in FIG. 9B, but significant in use of a water-based ink as illustrated in FIG. 9C.

To this point, for use of a water-based ink, the sheet deformation of recording sheet 400 is discussed. As seen from FIG. 8, the curl mount increased substantially in proportion to the ink amount. On the other hand, when looking the through density, it can be seen that the through density had an increased tendency to increase, as the ink amount was increased exceeding 100%. Further, when looking the obverse density, it can be seen that the through density was little increased, as the ink amount exceeded 100%. For such reasons, the maximal drop number in the default pattern table is determined to control the obverse density, through density, sheet deformation, curl amount, and the like within adequate ranges.

In this embodiment, the maximal drop number (5) in the default pattern table shown in FIG. 7A is determined as a drop number corresponding to an ink amount=100%, subject to the recording sheet 400 as a plain paper sheet and the resolution to be 300 dpi when printing. Hence, when the type of recording sheet 400 as well as the printing resolution is varied, also the maximal drop number in the default pattern table may be changed accordingly.

The default pattern table in FIG. 7A corresponding to a normal color reproduction range was applied to a conversion from values of CMYK dot image data to drop numbers, which were used to make a print. This resulted in an obverse density (in OD value) of images on the recording sheet 400 substantially equal to '1'.

On the other hand, the maximal drop number was increased to '6' or more. In this case, the obverse density was not as significantly increased as was in the course of increasing the maximal drop number to '5'. Even so, when compared with the case of using the maximal drop number '5', the obverse density was increased in any way. As the obverse density was increased, the color reproduction range should have been extended in a gamut covering that ink color.

The conversion using the default pattern table in FIG. 7A gave drop numbers, which were used to print images, which had a color reproduction range at a certain value of lightness L*. It is now assumed that this color reproduction range was, for instance, as is illustrated in a lower half of FIG. 10A. Here, if the extended pattern table shown in FIG. 7B or 7C is applied to increase the density of an ink of a color (assumed as M (magenta)) belonging to a sector gamut (as a specific gamut) on an a*b* plane shown in an upper half of FIG. 10A, there should appear a color reproduction range extended in a gamut including R (red) as illustrated in a lower half of FIG. 10B.

Figure 11:
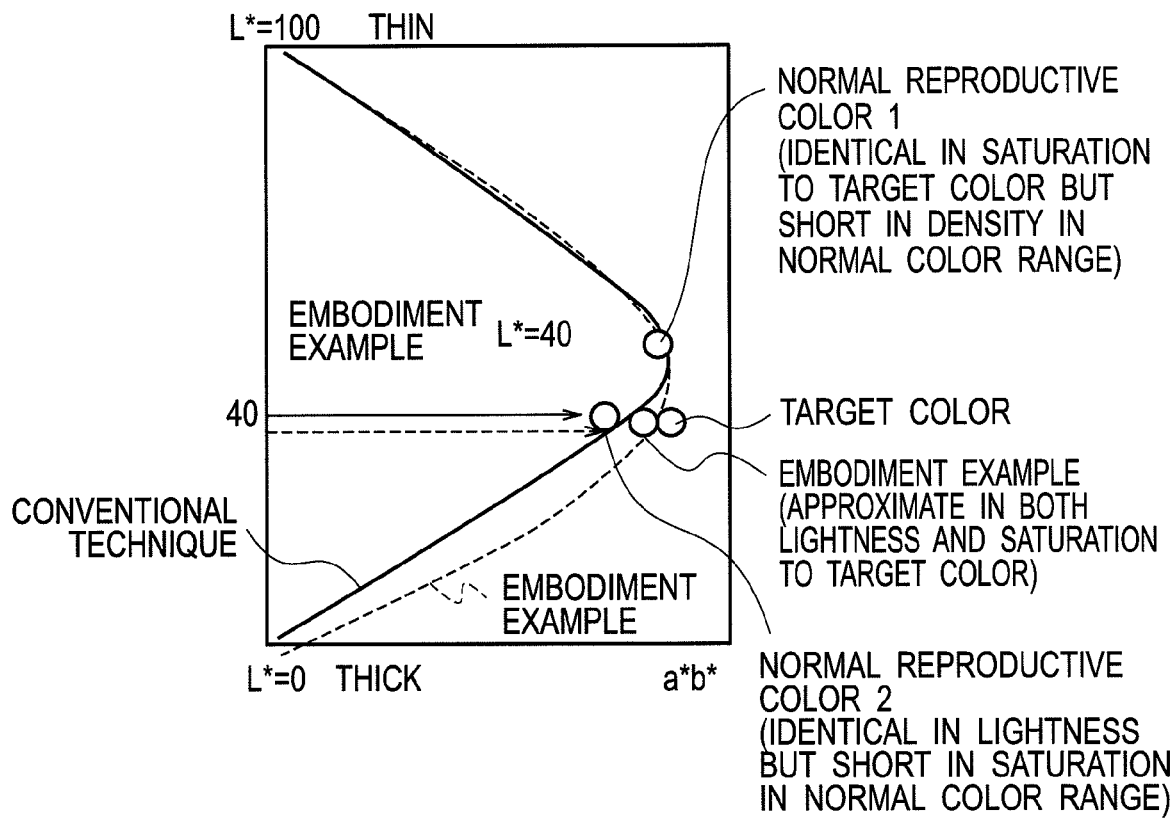
FIG. 11 is a graph describing color reproduction ranges by lightness value (or by density) with respect to a hue in the specific gamut in FIG. 10A and FIG. 10B before and after an increase in the maximal drop number of an ink of a corresponding color.

FIG. 11 is a graph illustrating color reproduction ranges by lightness value (or by density) with respect to a hue at the center of the sector gamut (as the specific gamut) on the a*b* plane shown in the upper half of FIG. 10A, as well as in an upper half of FIG. 10B. FIG. 11 describes the color reproduction ranges as they are developed before and after the increase in maximal drop number of the ink of a color corresponding to the specific gamut. As illustrated in FIG. 11, for instance, at a lightness value L*=40, there is a target color (as a color of RGB dot image data) residing outside the color reproduction range (shown by solid lines) developed before the increase in maximal drop number of the ink of the color corresponding to the specific gamut.

Here, as for an ink of a color belonging to the specific gamut, if the maximal drop number is increased, the obverse density of image in the specific gamut increases. By this effect, the color reproduction range of the specific gamut at the lightness value L*=40 is extended, so the target color is covered by the color reproduction range as shown by broken lines.

For the color reproduction range of the specific gamut to be extended, values of CMYK dot image data are converted by using either extended pattern table that has a greater maximal drop number than the default pattern table. After the conversion, resultant drop numbers are used to print images. As a result, in the graph in FIG. 8, the ink amount (%) indicated by the horizontal axis had higher values than 100%. This caused a relative increase not simply in the obverse density, but also in the through density, as well as in the amount of sheet deformation in use of a water-based ink.

In the example in the graph in FIG. 8, the through density had an enhanced increasing rate as the ink amount exceeded 150%. It therefore is desirable in use of either extended pattern table to control the ink amount to 150% or less when printing images with drop numbers after the conversion using the extended pattern table.

In this embodiment, in the extended pattern table shown in FIG. 7C, the maximal drop number (7) is determined as a drop number corresponding to the ink amount=150%, subject to the recording sheet 400 as a plain paper sheet and the resolution to be 300 dpi when printing. In the extended pattern table shown in FIG. 7B, the maximal drop number (6) is determined as a drop number smaller by a unity than the maximal drop number in the extended pattern table shown in FIG. 7C.

The default pattern table and the extended pattern tables are used in different manners, as described. For use of the difference, there are two manners of thinking to be applied when increasing the maximal discharge amount of an ink of a color belonging to a specific gamut of colors, to extend a color reproduction range of the specific gamut, as follows.

The thinking first to come is increasing the maximal discharge amount of ink simply of an ink of a color belonging to a specific gamut of colors, refraining from increasing the maximal discharge amount of any ink having a color belonging to a gamut of colors outside the specific gamut.

To follow this thinking, one may change using the default pattern table as usual for a conversion from CMYK dot image data into ink drop numbers, to using either extended pattern table for the conversion to implement an increase in maximal discharge amount of ink.

This thinking complies with the image of extending the color reproduction range simply to the specific gamut in a limiting manner, as shown in the lower half of FIG. 10B.

The thinking next to come is coping with the presence of a gamut of colors extending color reproduction ranges, by increasing maximal discharge amounts of inks of formally all colors. Despite, operationally, the coping is subjected when converting CMYK dot image data into ink drop numbers, to allotting no more than drop numbers of five drops or less to any ink having a color belonging to a gamut of colors outside a specific gamut of colors at which an extension of color reproduction range is desirable.

To follow this thinking, first, one may increase the maximal discharge amounts of inks of all colors from 5 drops to 6 or 7 drops. As for any ink having a color belonging to the specific gamut, the maximal discharge amount of ink is not limited to 5 drops or less, so either extended pattern table is used to convert CMYK dot image data into ink drop numbers, allotting drop numbers up to a maximal drop number of 7 drops (or up to a maximal drop number of 6 drops). On the other hand, for any ink having a color belonging to the gamut of colors outside the specific gamut, the maximal discharge amount of ink to be actually allotted is limited to 5 drops or less, so the default pattern table is used to convert CMYK dot image data into ink drop numbers.

Figure 12:
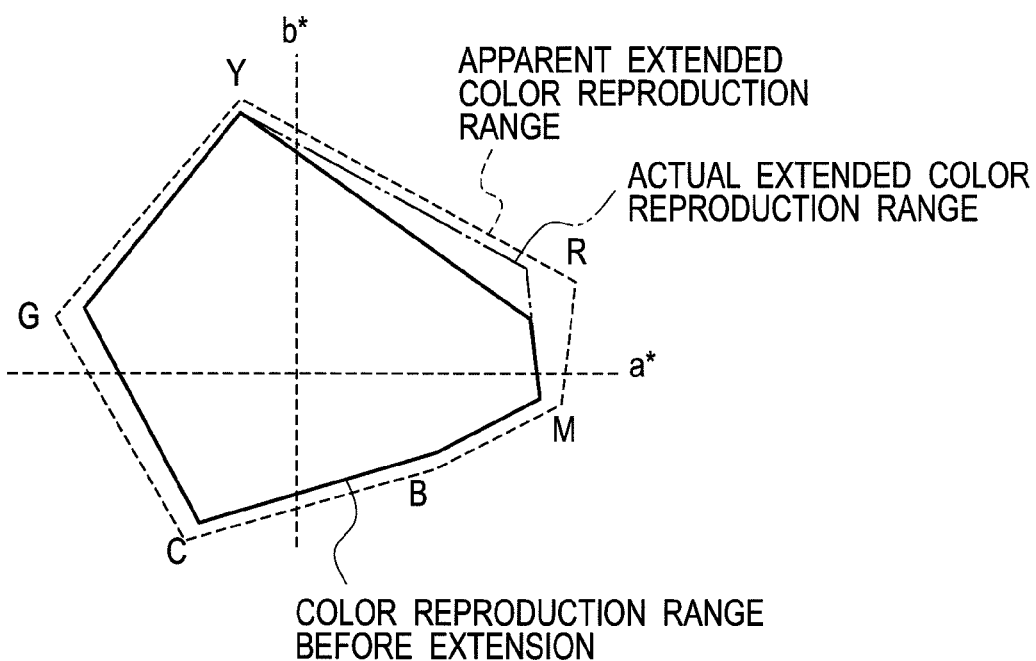
FIG. 12 is a graph illustrating appearances of a color reproduction range apparently extended by an extended pattern table formally applied also to an ink of a color belonging to a gamut of colors outside the specific gamut for a conversion to drop numbers.

This thinking increases maximal discharge amounts of inks of formally all colors, and apparently complies with the image of having maximal discharge amounts of inks once extended in a whole gamut of colors, as illustrated by an explanatory diagram in FIG. 12. However, operationally, for any ink having a color belonging to the gamut of colors outside the specific gamut, the maximal discharge amount of ink is limited to 5 drops or less. As a result, simply at the specific gamut, the color reproduction range is allowed to extend in a limiting manner.

The CMYK dot image inputter 210 inputs color image data defined in the CMYK color system (as CMYK dot image data). The image processor 223 uses any one of tables shown in FIG. 7A to 7C as a lookup table 223a for one of CMYK colors, to convert input CMYK dot image data into (print-addressing multi-value data as) numbers of drops of ink to be propelled out of nozzles of inkjet heads 312 of a corresponding color.

Determining which to use as a lookup table 223a among the tables shown in FIGS. 7A to 7C does depend on whether or not a respective color of CMYK is a color belonging a specific gamut of colors that can extend a color reproduction range. To this point, description is now made of input operations to designate a specific gamut of colors to extend a color reproduction range at the touch panel display 240.

Figures 13, 14:
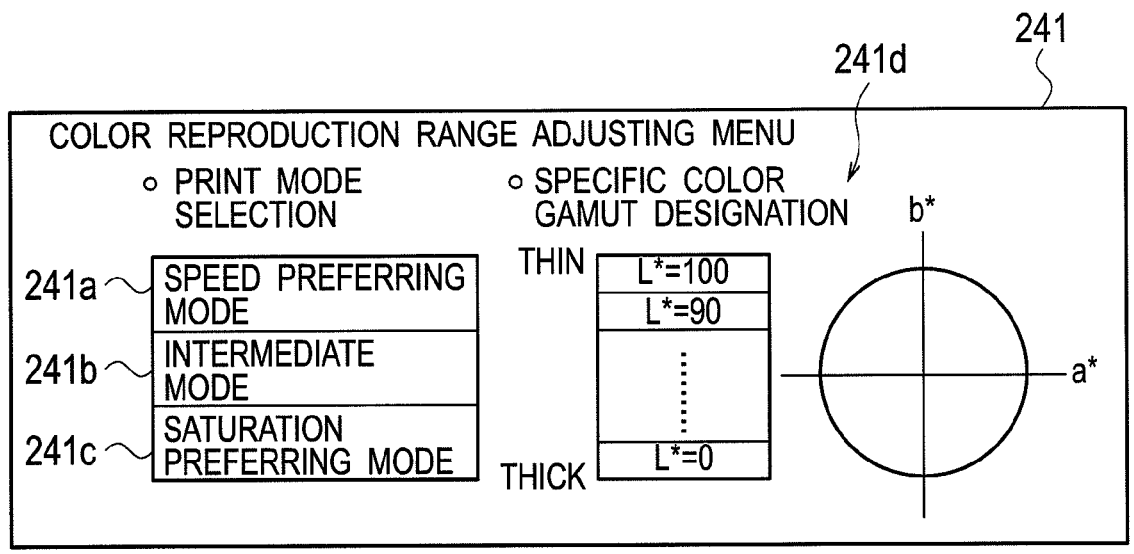
FIG. 13 is an illustration of an input designation screen rendered on a touch panel display in FIG. 1 with items including presence or absence of an extension of color reproduction range, and a gamut of colors for extending a color reproduction range.
FIG. 14 is a table listing maximal drop numbers determined by kind of recording sheet and resolution of print for use at the image processor in FIG. 3 in a conversion from CMYK dot pattern data to ink drop numbers.

FIG. 13 is an illustration of an input designation screen rendered on the touch panel display 240 of the printing device 20 with items including presence or absence of an extension of color reproduction range, and a gamut of colors for the extension. The input designation screen 241 of the touch panel display 240 is operable to select a print mode to thereby determine whether or not an extension of color reproduction range is to be made. For this operation, the input designation screen 241 has regions 241a, 241b, and 241c to select three modes being a speed preferring mode, an intermediate mode, and a saturation preferring mode. Among the regions 241a, 241b, and 241c, any one is operable to select a corresponding mode.

Selection of the intermediate mode or the saturation preferring mode is followed by a request for additional operations to designate a specific gamut of colors to extend the color reproduction range. Operations to designate a specific gamut of colors include touch operations to a specific gamut designation region 241d in the input designation screen 241. In this embodiment, the specific gamut designation region 241d is provided as a combination of a region for designating a density on an L* plane and a region for designating a hue on an a*b* plane. These regions can be operated by touch actions as necessary to designate a specific gamut of colors within a range of CMYK=(x1, y1, z1, α1)~(x100, y100, z100, α100). It is noted that there may be adaptation to designate a specific gamut designation range, and two or more specific gamuts of colors extending color reproduction ranges.

It also is noted that there may be a configuration adapted not to designate a specific gamut of colors by touch operations to the input designation screen 241, but to have a predetermined color gamut set as a specific gamut extending a color reproduction range in accordance with an intermediate mode or a saturation preferring mode. In this case, the specific gamut designation region 241d becomes unnecessary.

The designation of a specific gamut is made in a situation in which the intermediate mode or the saturation preferring mode is selected as a print mode by a touch operation made to the input designation screen 241 shown in FIG. 3 as described. It is now assumed that the specific gamut is designated as a range of CMYK=(x90, y90, z90, α90)~(x100, y100, z100, α100). Under this condition, the image processor 223 uses lookup tables 223a for conversions in different manners by color, as follows.

First, for a range of CMYK=(x1, y1, z1, α1)~(x90, y90, z90, α90) (outside the specific gamut), it uses the default pattern table shown in FIG. 7A, as a lookup table 223a. On the other hand, for the range of CMYK=(x90, y90, z90, α90)~(x100, y100, z100, α100) (on the specific gamut), it uses the extended pattern table shown in FIG. 7B (as the print mode is the intermediate mode) or the extended pattern table shown in FIG. 7C (as the print mode is the saturation preferring mode), as a lookup table 223a.

Accordingly, if the speed preferring mode is selected, the default pattern table shown in FIG. 7A is used to convert dot pattern data of CMYK into drop numbers of inks having corresponding colors. On the other hand, if the intermediate mode or the saturation preferring mode is selected, the extended pattern table shown in FIG. 7B (for the intermediate mode) or the extended pattern table shown in FIG. 7C (for the saturation preferring mode) is used for a conversion. This conversion is made from dot pattern data of colors belonging to the specific gamut concurrently designated, to drop numbers of inks having corresponding colors. In this case, for dot pattern data of colors belonging to a gamut of colors outside the designated specific gamut, the default pattern table shown in FIG. 7A is used to convert such data into drop numbers of inks having corresponding colors.

The specific gamut may reside on a hue largely depending on an ink of a color (as a primary color) of which the color reproduction range is not so extendable even when the discharge amount is increased. In this case, when converting CMYK dot pattern data of an ink of a color belonging to the specific gamut into drop numbers of ink, the maximal drop number may be changed in accordance with the hue on which the specific gamut is designated.

For instance, an ink of a Y (yellow) is now assumed as one of inks having colors belonging to the specific gamut. When the maximal discharge amount of the ink of the Y (yellow) is increased, the color reproduction range of the specific gamut will not be changed so much if the hue of the specific gamut is a color identical or near to the Y (yellow). Compared to this, if the hue of the specific gamut is a color identical or near to a R (red), the color reproduction range of the specific gamut will be greatly changed when the maximal discharge amount of the ink of the Y (yellow) is increased. Therefore, in the case the hue of the specific gamut is a color identical or near to the R (red), the maximal drop number of the Y (yellow) may well be set to a value of 7 drops. If it is a color identical or near to the Y (yellow), the maximal drop number of the Y (yellow) may well be set to a value of 6 drops.

As will be seen from the foregoing, at the printing device 20 shown in FIG. 3, the image processor 223 checks for a mode (the speed preferring mode, the intermediate mode, or the saturation preferring mode) selected in the input designation screen 241 on the touch panel display 240 shown in FIG. 13, and a specific gamut of colors associated with the intermediate mode or the saturation preferring mode. Then, depending on the mode as well as on the specific gamut, it determines for each of CMYK a lookup table 223a (FIG. 3) to be used for a conversion from CMYK dot image data to print-addressing multi-value data.

The image processor 223 outputs a profile of color images to the head driver 225 in the print executer 224. This profile thus contains information on print-addressing multi-value data created by a conversion using one of the pattern tables shown in FIGS. 7A, 7B, and 7C, as a lookup table 223a for each color of CMYK.

Therefore, in this embodiment, the specific gamut extending a color reproduction range in the printing device 20 can be set not simply to the three primary colors being C (cyan), M (magenta), and Y (yellow), but also to any secondary color produced by a subtractive color mixing between primary colors, as well as to any tertiary color produced by a subtractive color mixing of a primary color to a secondary color.

It is now assumed that the intermediate mode or the saturation preferring mode is selected and a specific gamut is designated on the input designation screen 241 of the touch panel display 240 shown in FIG. 13. The image processor 223 shown in FIG. 3 may be adapted to operate in this situation to determine which to use as a lookup table 223a among the pattern tables shown in FIGS. 7A to 7C, in consideration of a print condition acquired at the print condition acquirer 130 (FIG. 1).

For instance, when converting CMYK dot pattern data into drop numbers of ink, the maximal drop number may be changed in accordance with information on the type of recording sheet 400 involved in a print condition acquired at the print condition acquirer 130 (FIG. 1).

Between plain paper and matt paper, plain has a greater dot gain. Between matt paper and inkjet-oriented post card (IJ card), mat paper has a greater dot gain. When compared with small dot gains, large dot gains make the increase in dot diameter small, and retain extension effects to color reproduction range to be small, even if the maximal drop number is increased. Therefore, as shown in FIG. 14, the maximal drop number may be reduced, as the type of recording sheet 400 is changed for instance from an inkjet-oriented post card (IJ card) to mat paper, and to plain paper, having stepwise increased dot gains.

Further, the image processor 223 shown in FIG. 3 may operate, when converting CMYK dot pattern data into drop numbers of ink, to change the maximal drop number in accordance with the resolution for color image printing, as it is involved in a print condition acquired at the print condition acquirer 130 (FIG. 1).

When printing color images, if the resolution is high, the dot spacing is short in comparison with low resolutions. Even if the maximal drop number is increased, the variation in density is small, and extension effects to color reproduction range are retained small. To this point, for instance, as shown in FIG. 14, the maximal drop number may be set smaller for high resolutions, than for low resolutions.

In the pattern in FIG. 14, the maximal drop number is set to a value of 4 drops for conditions on the recording sheet 400 to be a plain paper sheet and the resolution to be 600 dpi when printing. There may be a set of pattern tables alternately prepared to be different from the pattern tables shown in FIGS. 7A, 7B, and 7C, to provide a maximal drop number equal to the value of 4 drops. Or else, for instance, when the drop number is set to a value of 5 drops after a conversion using the default pattern table shown in FIG. 7A, one may cope with this situation to e.g. uniformly turn down the result to a value of 4 drops.

There may be use of an inkjet printer of a multi-pass system different from the printing device 20 in this embodiment, to print a line of dot arrays in a transfer direction of a recording sheet 400 (as a sub-scan direction) by making a plurality of scans in a main scan direction. When using this inkjet printer to print color images, one may take into consideration also the number of scans for printing one line of dot arrays, as an item of print condition.

For instance, increased print scan numbers increase the number of times of ink discharge to a single dot, when compared with smaller ones. The number of discharged drops of ink is relatively increased every time of discharge with an increased maximal drop number. This is accompanied by an increased print time. This increase is multiplied by the number scans. This integration gives an enlarged accumulation of increased times, causing the requisite print time to elongate.

To this point, when the number of times of print scan is increased, the maximal drop number of any ink having a color belonging to a gamut of colors outside the specific gamut may well have its width of increment controlled to be relatively small compared with situations in which the scan time number is small.

By the way, in some situations one may want to uniformly extend color reproduction ranges of colors belonging to a specific gamut, and in some situations one may not want to extend color reproduction ranges of some hues. More specifically, as for a hue of R (red), an extension of the color reproduction range is desirable. However, if this is done, as for flesh colors also, the color reproduction range will be extended in a chain reaction, causing e.g. shades of flesh color to be changed in some case unintentionally.

Generally, flesh colors are memory colors, and even little changes in shade give significant differences in apparent impression. To this point, when trying to extend a color reproduction range, if the specific gamut includes flesh colors, it is desirable to exceptionally exclude flesh colors from targets of extension of the color reproduction range.

Accordingly, the image processor 223 in FIG. 3 may be adapted to accommodate color gamuts such as those of flesh colors defined in advance as prescribed color gamuts, and operate when a prescribed color gamut overlaps a specific gamut, to recognize a gamut of colors residing on the specific gamut outside the prescribed gamut. The image processor 223 may then be adapted to use either of the extended pattern tables shown in FIG. 7B and FIG. 7C, as a lookup table 223a to make a conversion to drop number of CMYK dot image data simply on the gamut of colors outside the prescribed gamut in the specific gamut.

Figure 15:
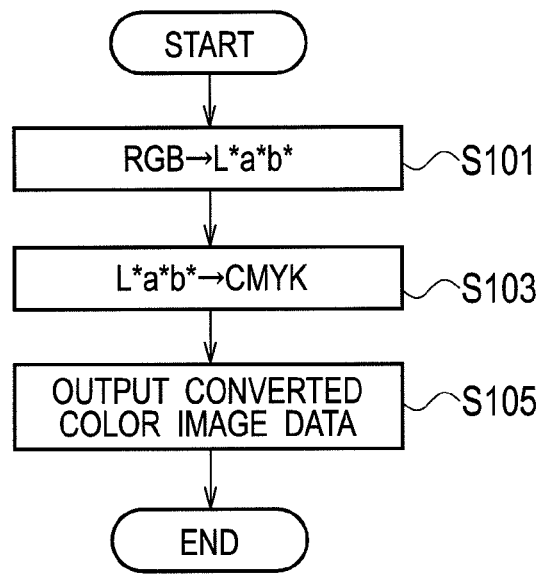
FIG. 15 is a flowchart showing a color matching process of color image data to be performed (as an image processing) at the color conversion processor of the color converting device in FIG. 1 by using the lookup tables associated with FIG. 6A and FIG. 6B.

Description is now made of a color matching process of color image data to be performed (as an image processing) at the color conversion processor 120 of the color converting device 10 in FIG. 1 by using lookup tables 122 shown in FIG. 6A and FIG. 6B, with reference to a flowchart in FIG. 15.

First, the color conversion processor 120 uses the table shown in FIG. 6A to convert RGB dot image data (color image data) input from the RGB dot image inputter 110, for a conversion from values in the RGB color system to values in the L*a*b* color system (at a step S101).

Then, the color conversion processor 120 converts the converted RGB dot image data (as color image data), for a conversion from values in the L*a*b* color system to values in the CMYK color system (at a step S103).

Continuously, the color conversion processor 120 outputs the converted color image data (as CMYK dot image data) in the CMYK color system together with a print condition acquired at the print condition acquirer 130, from the CMYK dot image outputter 140 to the CMYK dot image inputter 210 of the printing device 20 (at a step S105). After that, the color conversion processor 120 goes to an end of such a series of processes.

Figure 16:
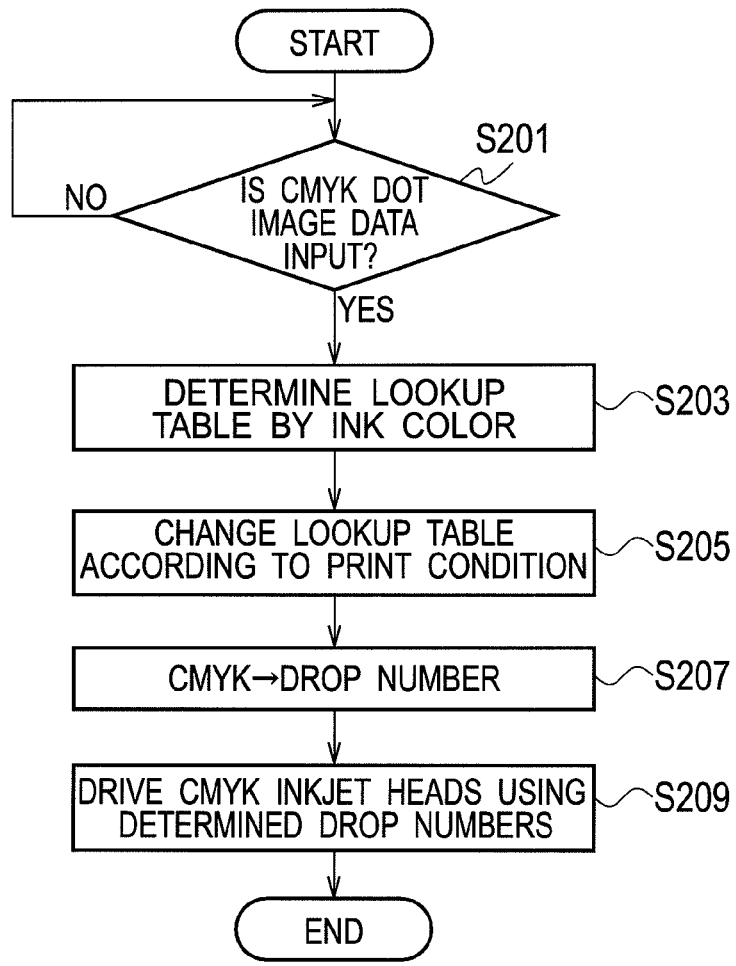
FIG. 16 is a flowchart showing a processing to be performed (as a printing process) using the lookup tables associated with FIGS. 7A, 7B, and 7C at the image processor of the printing device shown in FIG. 3 according to the embodiment.

Description is now made of a processing to be executed (as a printing process) using lookup tables 223a at the image processor 223 of the printing device 20 shown in FIG. 3, with reference to a flowchart in FIG. 16.

First, the image processor 223 checks for CMYK dot image data (as color image data) input from the CMYK dot image inputter 210 (at a step S201). If it is input (YES at the step S201), the image processor 223 determines for each ink color a table to be used as a lookup table 223a for a conversion from CMYK dot image data to print-addressing multi-value data (as drop numbers) (at a step S203). This determination is made on the basis of a selected mode and a specific gamut designated on the input designation screen 241 of the touch panel display 240 shown in FIG. 3.

The designated specific gamut may involve a gamut of flesh colors (as a prescribed gamut). In this case, the image processor 223 operates by determination not to select the extended pattern table (maximal drop number=7) in FIG. 7C, but to select the default pattern table (maximal drop number=5) in FIG. 7A for use to a conversion of the gamut of flesh colors.

The designated specific gamut has colors belonging thereto, which may involve a color of an ink (as a primary color) of which the color reproduction range is not so extendable even when the discharge amount is increased. In this case, the image processor 223 may use a hue of the specific gamut as a basis to determine which to select between the extended pattern table (maximal drop number=6) in FIG. 7B and the extended pattern table (maximal drop number=7) in FIG. 7C, for use to convert CMYK dot image data of that color into drop numbers.

For instance, inks of colors belonging to the specific gamut may involve an ink of Y (yellow). In this case, the image processor 223 may operate to use the extended pattern table (maximal drop number=7) in FIG. 7C as the hue of the specific gamut is a color identical or near to R (red), or to use the extended pattern table (maximal drop number=6) in FIG. 7B as it is a color identical or near to Y (yellow).

Next, as for each table determined by color at the step S203 to use as a lookup table 223a, the image processor 223 makes a change as necessary on based the print condition (type of recording sheet 400 and resolution) input together with CMYK dot image data from the CMYK dot image inputter 210 (at a step S205).

For instance, the print condition may involve a resolution to be 300 dpi when printing and a recording sheet 400 to be a plain paper sheet, as items of condition. In this case, the extended pattern table (maximal drop number=6 or 7) in FIG. 7B or FIG. 7C once determined at the step S203 to use as a table for conversion of colors belonging the specific gamut is changed to the default pattern table (maximal drop number=5) shown in FIG. 7A.

Continuously, at the image processor 223, a table determined at the step S203 or changed as necessary at the step S205 is used as a lookup table 223a to convert CMYK dot image data (as color image data) input from the CMYK dot image inputter 210 into drop numbers for each of ink colors (at a step S207).

Then, the image processor 223 outputs converted drop numbers to the head driver 225 of the print executer 224 (at a step S207). After that, the image processor 223 goes to an end of such a series of processes.

Such being the case, according to this embodiment, when a specific gamut of colors extending a color reproduction range is designated by operations to the input designation screen 241 on the touch panel display 240, essentially the maximal drop number is varied from a normal number of drops (5 drops) to an increased number (7 drops). This occurs when converting CMYK dot pattern data of any ink having a color belonging to the designated specific gamut, into drop numbers of the ink. That is, an increase occurs in the maximal number of drops of ink to be discharged to dots constituting color images (as a maximal discharge amount per unit area of an ink to be used to print the color images). Thus, in the specific gamut, the amount of ink is increased relative to a gamut of colors outside the specific gamut.

As a result, in the specific gamut, the concentration of colors in printed color images is increased (with the lightness left as it is), extending the color reproduction range, more than a gamut of colors outside the specific gamut. Therefore, an adequate setup of a specific gamut can extend the color reproduction range when printing color images, with respect to an arbitrary hue.

Further, according to this embodiment, when the specific gamut includes a prescribed gamut such as a flesh color region, the image processor 223 uses either extended pattern table (having a maximal drop number=6 or 7) in FIG. 7B or FIG. 7C simply for a gamut of colors outside the prescribed gamut in the specific gamut, to make a conversion into drop numbers with respect to colors belonging to that gamut.

The partial gamut is a gamut that does not need any extension of color reproduction range. This gamut is included in the specific gamut, as the maximal discharge amount of ink is increased to extend a color reproduction range of the specific gamut. However the maximal discharge amount of ink can now be prevented from being increased up to that gamut. Therefore, when an extension of color reproduction range is desirable for instance at a gamut of red colors, it is possible to prevent those shades of flesh colors having been reproduced in natural colors from being shifted to colors different from the natural colors, along with the extension.

Further, according to this embodiment, CMYK dot pattern data in a specific gamut of colors or in a gamut of colors outside the specific gamut can be converted into drop numbers of ink, by using a table as a lookup table 233a, which is changed (or corrected) in accordance with the type of recording sheet 400 or the resolution when printing color images, or depending on the color of ink belonging to the specific gamut.

Therefore, in such situations that the extension effect of color reproduction range has differences when the maxim drop number is increased according to the type (dot gain) of recording sheet 400 or the resolution in the printing color images, or depending on the color of ink belonging to the specific gamut, an adequate maximal drop number can be allotted in a manner adaptive to respective characteristics. This can be done while setting the amount of ink soaked in a sheet, as well as the amount of sheet deformation and the degree of through density of ink soaking from a printed side to the reverse, in an adequate range. This allows for an extended color reproduction range in the specific gamut of colors.

Further, according to this embodiment, when printing color images, a priority to the image quality or the printing speed can be set by designating a print mode in the input designation screen 241 on the touch panel display 240. This can be done to use a table according to the designated print mode, as a lookup table 223a for conversing CMYK dot pattern data into numbers of drops of ink.

Therefore, an adequate selection and setup can be made, as to which to prefer between the extension of color reproduction range and the printing speed that decreases inconsistent therewith. This can be done when increasing a maximal value in numbers of drops of ink to be propelled (as a maximal drop number) onto an identical pixel (dot) to extend a color reproduction range.

It is noted that in the embodiment described the color converting device 10 makes a conversion from an RGB color system to a L*a*b* color system. There may be an adaptation to make a conversion of color space from any color space free from the printing device 20, to a CMYK color system substituting for the L*a*b* color system.

Finally, the foregoing embodiment and effects thereof will be discussed as a whole. According to an aspect of embodiment of the present invention, there is provided a printing method of printing color images. This is a printing method of printing color images based on color image data (for instance, dot image data of the RGB format input at the RGB dot image inputter 110 in FIG. 1) in a prescribed reproduction range of colors (for instance, the color reproduction range illustrated in the lower half of FIG. 10A) in a color space. The printing method includes setting a specific gamut of colors (for instance, the color gamut of the sector form illustrated in the upper half of FIG. 10A) extending the reproduction range. And the printing method includes making a maximal discharge amount per unit area of ink (for instance, the maximal drop number in the table in FIG. 7B or FIG. 7C) to be used to print colors in the specific gamut among the color images greater than a maximal discharge amount per unit area of ink (for instance, the maximal drop number in the table in FIG. 7A) to be used to print colors in a gamut of colors outside the specific gamut among the color images.

Further, according to an aspect of embodiment of the present invention, there is provided a printing processor for printing color images. This is a printing processor adapted to implement a processing of using multi-color inks to print color images based on color image data in a prescribed reproduction range of colors in a color space. The printing processor includes a setter (for instance, the image processor 223 in FIG. 3 combined with the mode selecting regions 241a to 241c in FIG. 13), and a converter (for instance, the image processor 223 in FIG. 3 associated with the step S207 in FIG. 16). The setter sets a specific gamut of colors extending the reproduction range. The converter converts color image data in a gamut of colors outside the specific gamut set up by the setter, into data of ink amounts of a multi-color ink having a prescribed reference value (for instance, the maximal drop number='5' in the default pattern table in FIG. 7A) as a maximal discharge amount per unit area. The converter converts color image data in the specific gamut set up by the setter, into data of ink amounts of a multi-color ink having an upper limit value (for instance, the maximal drop number='6' or '7' in the extended pattern table in FIG. 7B or FIG. 7C) greater than the reference value as a maximal discharge amount per unit area.

According to the above embodiment, there is set a specific gamut of colors extending a color reproduction range on a color space. In this situation, the maximal discharge amount per unit area of ink to be used to print color images is made greater in the specific gamut of colors than in a gamut of colors outside that. Accordingly, for printed color images, the color reproduction range is more extended in the specific gamut of colors than in the gamut of colors outside that. Therefore, when printing color images, the color reproduction range can be extended with respect to an arbitrary hue by setting a specific gamut of colors as necessary.

It is noted that in the above embodiment, the converter may be adapted to convert color image data in the specific gamut excluding color image data in a prescribed gamut of colors including a flesh color region into data of ink amounts of a multi-color ink having an upper limit value greater than the reference value as a maximal discharge amount per unit area.

According to this embodiment, when the specific gamut has therein a prescribed gamut of colors including a flesh color region, the converter is operable to convert color image data in the prescribed gamut in the specific gamut into data of ink amounts of a multi-color ink having the reference value as a maximal discharge amount per unit area. Further, the converter is operable to convert color image data in the gamut excluding the prescribed gamut into data of ink amounts of a multi-color ink having an upper limit value greater than the reference value as a maximal discharge amount per unit area.

The prescribed gamut is a gamut of colors including a flesh color region that does not need any extension of color reproduction range. This gamut is included in the specific gamut, as the maximal discharge amount of ink is increased to extend a color reproduction range of the specific gamut. However the maximal discharge amount of ink can now be prevented from being increased up to that gamut. Therefore, when an extension of color reproduction range is desirable for instance at a gamut of red colors, it is possible to prevent those shades of flesh colors having been reproduced in natural colors from being shifted to colors different from the natural colors, along with the extension.

According to another aspect, the above embodiment further includes an upper limit corrector (for instance, the image processor 223 in FIG. 3 associated with the step S205 in FIG. 16). The upper limit corrector corrects the upper limit value based on one or more of a print scan number, a resolution, and a dot gain of the color images to be printed.

According to this embodiment, the print scan number as well as the resolution or the dot gain of the color images to be printed acts on the amount per unit area of an ink used for the printing. The amount of ink used for the printing has an effect on the amount of ink soaked in a sheet, as well as on the amount of sheet deformation and the degree of through density of ink soaking from a printed side to the reverse (for instance, the sheet deformation amount and the through density in FIG. 8). Therefore, the upper limit of ink amount is corrected as necessary based on one or more of the print scan number, the resolution, and the dot gain. This is done to set the amount of ink soaked in a sheet, as well as the amount of sheet deformation and the degree of through density of ink soaking from a printed side to the reverse, in an adequate range allowing for an extended color reproduction range in the specific gamut of colors.

According to another aspect, the above embodiment further includes a designator (for instance, the image processor 223 in FIG. 3 associated with the specific gamut designation region 241d in FIG. 13). The designator is operable to designate a printing speed or an image quality of the color images whichever is preferred. The converter is adapted to operate simply when the image quality is designated as being preferred at the designator, to convert color image data in the specific gamut of colors in the color space into data of ink amounts of a multi-color ink having the upper limit value as a maximal discharge amount per unit area.

According to this embodiment, the requisite printing time of color images increases as the maximal discharge amount of ink used for printing the color images is increased. This is significant at an inkjet printer of a multi-drop system (for instance, at the printing mechanism 220 of the printing device 20 in FIG. 1) operable to increase or decrease the number of droplets to be propelled onto an identical pixel (dot) as necessary to implement a tone printing. Therefore, when giving a priority to the printing speed, the designator is operable to designate the printing speed as being preferred, to avoid slowdowns of printing speed due to an increased maximal discharge amount of ink.

According to another aspect, the above embodiment further includes an upper limit determiner (for instance, the image processor 223 in FIG. 3 associated with the step S203 in FIG. 16). The upper limit determiner uses a hue in the specific gamut of colors in the color space as a basis to determine an upper limit value of a multi-color ink of a color belonging to the specific gamut, for a respective color of ink.

According to this embodiment, if the specific gamut resides on a hue largely depending on an ink of a color (as a primary color) of which the color reproduction range is not so extendable even when the discharge amount is increased, the upper limit value of maximal discharge amount of any ink of that color can be determined as a value lower than usual. For instance, an ink of a Y (yellow) is now assumed as one of inks having colors belonging to the specific gamut. When the maximal discharge amount of the ink of the Y (yellow) is increased, the color reproduction range of the specific gamut will not be changed so much if the hue of the specific gamut is a color identical or near to the Y (yellow). Compared to this, if the hue of the specific gamut is a color identical or near to a R (red), the color reproduction range of the specific gamut will be greatly changed when the maximal discharge amount of the ink of the Y (yellow) is increased. Therefore, in the case the hue of the specific gamut is a color identical or near to the Y (yellow), the upper limit value of maximal discharge amount of the ink of the Y (yellow) can be set to a value lower than usual although it is increased. Such being the case, for any ink having a color belonging to the specific gamut, the upper limit value of maximal discharge amount of the ink can be set to an individual value to be adequate to extend the color reproduction range, by increasing the discharge amount of the ink of that color.

According to another aspect, in the above embodiment, the converter includes an input end converter (for instance, the color conversion processor 120 of the color converting device 10 in FIG. 1 associated with the step S101 in FIG. 15), an output end converter (for instance, the color conversion processor 120 of the color converting device 10 in FIG. 1 associated with the step S103 in FIG. 15), and an ink amount converter (for instance, the image processor 223 in FIG. 3 associated with the steps S203 to S207 in FIG. 16). The input end converter uses an input profile (for instance, the lookup table 122 in FIG. 6A) as a basis to convert color image data into data in the color space (for instance, an L*a*b* color system). The output end converter uses an output profile (for instance, the lookup table 122 in FIG. 6B) as a basis to convert the data in the color space into CMYK data (for instance, dot image data of a CMYK format output from the CMYK dot image outputter 140). The ink amount converter uses a lookup table (for instance, one of the lookup table 223a in FIG. 3, and the default pattern datable and extended pattern tables in FIGS. 7A, 7B, and 7C) as a basis to convert the CMYK data into an ink amount of a multi-color ink of a respective color corresponding thereto. The ink amount converter is adapted to select the lookup table from among lookup tables of types different by maximal discharge amount of ink per unit area, as one type depending on whether or not the data of the color space that the output end converter has converted into the CMYK data is data of a hue in the specific gamut, and use the selected lookup table to convert the CMYK data into an ink amount of a multi-color ink of a respective color corresponding thereto.

According to this embodiment, one of lookup tables of types different from each other is selected for a respective color of CMYK, depending on whether or not this is a hue of the specific gamut for a target of the color reproduction range to be extended, to make a conversion from CMYK data to an ink amount of an ink of a respective color. Therefore, lookup tables of different types are selected, thereby permitting a plurality of patterns of data to be converted using a single profile.

It is noted that inks used in the foregoing embodiments may be oil-based inks. Oil-based inks have smaller dot gains than water-based inks, as an advantage when printing color images with a high resolution. Further, they have smaller tendencies to soak in a sheet than water-based inks. This allows for a controlled increase in the amount of ink soaked in a sheet, as well as the amount of sheet deformation and the degree of through density of ink soaking from a printed side to the reverse, when increasing the amount of ink to print color images.

Further, there may be a printer (for instance, the inkjet printer 80 in FIG. 4B) implemented as an embodiment including a printing processor (for instance, the color converter 820 in FIG. 4B) according to any embodiment described, and an image former (for instance, the inkjet printing mechanism 830 in FIG. 4B). The printing processor may be configured with a converter to convert color image data into data of ink amounts of multi-color inks. The image former may be configured to print on a print sheet a frame of color images based on the data of ink amounts. The image former may be adapted to perform a single scan in a main scan direction perpendicular to a transfer direction (for instance, the recording sheet transfer (sub-scan) direction shown in FIG. 2), to print a single line of dot arrays of color images in the transfer direction.

According to this embodiment, one line of dot arrays can be printed to the end by a single scan in the main scan direction, even when the maximal discharge amount of ink is increased to extend the color reproduction range. This permits the color reproduction range to be extended, affording to control the slowdown of printing speed as far as possible.

The present application claims the benefit of priority under 35 U.S.C. §119 to Japanese Patent Application No. 2011-121382, filed on May 31, 2011, the entire content of which is incorporated herein by reference.

What is claimed is:

1. A printing method of printing color images based on color image data in a prescribed reproduction range of colors in a color space, the printing method comprising:
    setting a specific gamut of colors extending the reproduction range; and
    making a maximal discharge amount per unit area of ink to be used to print colors in the specific gamut among the color images greater than a maximal discharge amount per unit area of ink to be used to print colors in a gamut of colors outside the specific gamut among the color images.

2. A printing processor adapted to implement a processing of using multi-color inks to print color images based on color image data in a prescribed reproduction range of colors in a color space, the printing processor comprising:
    a setter configured to set a specific gamut of colors extending the reproduction range; and
    a converter configured to; convert color values of color image data in a gamut of colors outside the specific gamut into data of ink amounts for a respective ink color; set a greater than a reference value as an upper limit value for the respective color ink color, the reference color being a maximal discharge amount per unit area of ink to be used to print colors in the gamut outside the specific gamut; and convert color values of color image data in the specific gamut into data of ink amounts for the respective ink color, having the upper limit value as a maximal discharge amount per unit area of ink to be used to print colors in the specific gamut.

3. The printing processor according to claim 2, wherein when the specific gamut includes a flesh color region, the converter is adapted to convert color image data in the specific gamut excluding color image data in a prescribed gamut of colors including the flesh color region into data of ink amounts for the respective ink color having the upper limit value as a maximal discharge amount per unit area of ink to be used to print colors in the specific gamut.

4. The printing processor according to claim 2, further comprising an upper limit corrector configured to correct the upper limit value based on one or more of a print scan number, a resolution, and a dot gain of the color images to be printed.

5. The printing processor according to claim 2, further comprising a designator configured to designate a printing speed or an image quality of the color images whichever is preferred, wherein
    only when the image quality is designated as being preferred at the designator, the converter is adapted to convert color values of color image data in the specific gamut of colors in the color space into data of ink amounts for the respective ink color having the upper limit value as a maximal discharge amount per unit area of ink to be used to print colors in the specific gamut.

6. The printing processor according to claim 2, further comprising an upper limit determiner configured to determine the upper limit values of ink colors belonging to the specific gamut based on a hue in the specific gamut of colors in the color space.

7. The printing processor according to claim 2, wherein the converter comprises:
    an input end converter configured to convert color image data into data in the color space based on an input profile;
    an output end converter configured convert the data in the color space into CMYK data based on an output profile; and an ink amount converter configured to convert a color value of the CMYK data into an ink amount corresponding thereto for the respective ink color based on a lookup table, wherein the ink amount converter is adapted to select a lookup table from among lookup tables different by maximal discharge amount of ink per unit area, depending on whether or not the data of the color space that the output end converter has converted into the CMYK data is data of a hue in the specific gamut, and use the selected lookup table to convert the color value of the CMYK data into the ink amount corresponding thereto for the respective ink color.

* * * * *